United States Patent

Turner

[15] 3,697,603
[45] Oct. 10, 1972

[54] NOVEL PROCESS FOR PREPARING A HALOETHER

[72] Inventor: John O. Turner, West Chester, Pa.

[73] Assignee: Sun Oil Company, Philadelphia, Pa.

[22] Filed: March 22, 1971

[21] Appl. No.: 127,042

[52] U.S. Cl. ............260/614 A, 260/681, 260/632 R, 260/652 R
[51] Int. Cl..............................................C07c 43/00
[58] Field of Search......................................260/614

[56] References Cited

UNITED STATES PATENTS 3,360,583  12/1967  Hall et al. ..............260/614 A

FOREIGN PATENTS OR APPLICATIONS

39/3414  4/1964  Japan.....................260/614 N

OTHER PUBLICATIONS

Dermer et al., J. Amer. Chem. Soc. 74, 4565–4597 (1952)

Primary Examiner—Howard T. Mars
Attorney—George L. Church, Donald R. Johnson, Wilmer E. McCorquodale and Stanford M. Back

[57] ABSTRACT

The haloether, 3-halo-3-methylbutyl methyl ether, of the formula

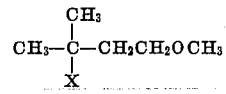

can be prepared when methylal is reacted with isobutylene in the presence of $BX_3$, wherein X is chloro, bromo or iodo. This haloether can be converted to isoprene by known pyrolysis methods.

4 Claims, No Drawings

NOVEL PROCESS FOR PREPARING A HALOETHER

CROSS-REFERENCE TO RELATED APPLICATION

The subject matter of this case is related to the subject matter of co-pending application, Ser. No. 126,934 filed Mar. 22, 1971, in the name of John O. Turner and entitled "NOVEL PROCESS FOR THE PREPARATION OF ISOPRENE."

BACKGROUND OF THE INVENTION

This invention relates to a novel process for the preparation of the haloether 3-halo-3-methylbutyl methyl ether by the reaction of methylal and isobutylene with $BCl_3$, $BBr_3$ or $BI_3$. The resulting haloether is useful as an intermediate in the preparation of isoprene, as taught by U.S. Pat. No. 3,360,583, wherein the chloroether is pyrolyzed to give isoprene, methanol, methyl chloride and HCl.

In related application, Ser. No. 126,934, of John O. Turner, referred to above, there is taught the reaction of methylal with isobutylene in the presence of $BF_3$ to produce a mixture of 1,3-dimethoxy-3-methylbutane, 4-methoxy-2-methylbutene-1 and isoprene, which mixture, on pyrolysis, yields isoprene and methanol.

SUMMARY OF THE INVENTION

It has now been found that a useful intermediate in the synthesis of isoprene may be formed in accordance with the following reaction scheme:

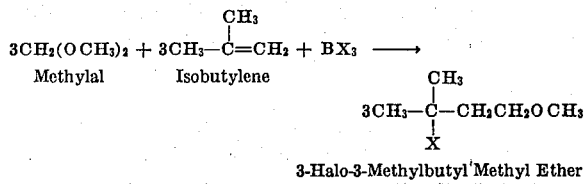

wherein X is chlorine, bromine or iodine. Minor amounts of the corresponding t-butyl halide are likewise produced by this process in amounts of 10 percent or less.

The results of this process are quite surprising in view of the above-reported results with $BF_3$ wherein a mixture of entirely different reaction products is reported.

DESCRIPTION OF THE INVENTION

This reaction may conveniently be carried out at atmospheric pressure, but is more desirably conducted in a sealed vessel under autogenous pressure. The reaction is then carried out at a temperature of from 0° to 100° C, and preferably at 25° to 50° C, for a time period sufficient to complete the reaction, generally from about 30 minutes to 4 hours, depending upon the temperature employed.

Since the reaction is stoichiometric, the amount of reactants employed is not critical, and an excess of one reactant or another may be employed. However, most desirably the reactants should be used in molar ratios of 3:3:1 of methylal, isobutene and $BX_3$, respectively.

The resulting haloether product is readily recovered by treating the reaction solution with an alkaline reagent such as aqueous sodium or potassium carbonate to form an aqueous phase containing the boron residue and an organic phase containing the haloether and a minor amount of the t-butyl halide.

This invention will now be illustrated by the following examples.

EXAMPLE 1

To a pressure vessel containing 228 grams (3.0 m) of methylal, 117 grams (1.0 m) of $BCl_3$ is added 56 grams (1.0 m) of isobutylene. The mixture is stirred at room temperature for 2 hours, at the end of which time the product mixture is neutralized with aqueous $Na_2CO_3$ and the resulting organic phase, containing of 123 grams (90 percent yield) of 3-chloro-3-methylbutyl methyl ether, is recovered.

EXAMPLE 2

In accordance with the procedures of Example 1, but substituting 250.6 grams (1.0 m) of $BBr_3$ for the $BCl_3$, and adding 456 grams (6.0 m) of methylal, there is obtained 3-bromo-3-methylbutyl methyl ether (95 percent yield).

EXAMPLE 3

In accordance with the procedures of Example 1, but substituting 196 grams (0.5 m) of $BI_3$ for the $BCl_3$, and 56 grams (1.0 m) of isobutylene, there is obtained 3-iodo-3-methylbutyl methyl ether (80 percent yield).

What is claimed is:

1. A process for the production of a haloether of the formula

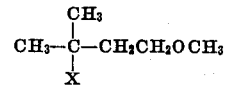

, wherein X is chlorine, bromine or iodine, which comprises reacting methylal and isobutylene with a compound selected from the group consisting of $BCl_3$, $BBr_3$ and $BI_3$ at a temperature of from 0° to 100° C.

2. The process according to claim 1 wherein $BCl_3$ is employed and the product is 3-chloro-3-methylbutyl methyl ether.

3. The process according to claim 1 wherein $BBr_3$ is employed and the product is 3-bromo-3-methylbutyl methyl ether.

4. The process according to claim 1 wherein $BI_3$ is employed and the product is 3-iodo-3-methylbutyl methyl ether.

* * * * *